US006745301B2

(12) United States Patent
Ma et al.

(10) Patent No.: US 6,745,301 B2
(45) Date of Patent: Jun. 1, 2004

(54) MICROCONTROLLER PROGRAMMABLE METHOD FOR ACCESSING EXTERNAL MEMORY IN A PAGE MODE OPERATION

(75) Inventors: Edward Tangkwai Ma, Plano, TX (US); Joseph P. Gorski, Plano, TX (US)

(73) Assignee: Dallas Semiconductor, Dallas, TX (US)

( * ) Notice: Subject to any disclaimer, the term of this patent is extended or adjusted under 35 U.S.C. 154(b) by 359 days.

(21) Appl. No.: 09/924,631

(22) Filed: Aug. 7, 2001

(65) Prior Publication Data

US 2002/0103978 A1 Aug. 1, 2002

Related U.S. Application Data

(60) Provisional application No. 60/223,176, filed on Aug. 7, 2000, and provisional application No. 60/223,668, filed on Aug. 7, 2000.

(51) Int. Cl.$^7$ .......................... G06F 12/00; G06F 13/00
(52) U.S. Cl. .................. 711/154; 711/167; 710/27; 710/58; 365/230.02
(58) Field of Search ................ 711/154, 167; 710/4, 27–28, 33, 58, 305; 365/189.02, 189.05, 194, 230.02, 233

(56) References Cited

U.S. PATENT DOCUMENTS

| 5,253,214 A | * | 10/1993 | Herrmann | 365/233 |
| 5,652,847 A | * | 7/1997 | Padwekar | 710/305 |
| 6,021,453 A | * | 2/2000 | Klingman | 710/305 |
| 6,327,192 B1 | * | 12/2001 | Lee | 365/189.05 |
| 6,477,625 B1 | * | 11/2002 | Pascucci et al. | 711/154 |

* cited by examiner

Primary Examiner—Mano Padmanabhan
Assistant Examiner—Pierre M. Vital
(74) Attorney, Agent, or Firm—Jenkens & Gilchrist

(57) ABSTRACT

A microcontroller and method for executing instructions from an 8051 instruction set are disclosed. The microcontroller includes first and second input/output (I/O) ports that are controlled such that the first I/O port is a dedicated data port and the second I/O port is a dedicated address port for performing memory cycles to external memory when in a page mode of operation. In addition, the cycle times of memory cycles to external memory is configurable so that the microcontroller is capable of more efficiently cooperating with both high speed and low speed external memory devices.

28 Claims, 4 Drawing Sheets

MICROCONTROLLER PROGRAMMABLE METHOD FOR ACCESSING EXTERNAL MEMORY IN A PAGE MODE OPERATION

CROSS-REFERENCES TO RELATED APPLICATIONS

This Nonprovisional Application for Patent claims the benefit of priority from, and hereby incorporates by reference the entire disclosure of, U.S. Provisional Application for Patent Serial No. 60/223,176, filed on Aug. 7, 2000, and U.S. Provisional Application for Patent Serial No. 60/223,668, also filed on Aug. 7, 2000.

BACKGROUND OF THE INVENTION

1. Technical Field of the Invention

The present invention relates to eight bit microcontrollers, and particularly to executing memory access cycles by a microcontroller in a page mode of operation.

2. Description of the Related Art

An 8-bit microcontroller is used extensively in products today because of its small size, low power consumption, and flexibility. Because the market for 8-bit microcontrollers continues to grow, silicon manufacturers are pushing the development of faster, more efficient 8-bit microcontrollers.

The 8051 microcontroller is a heavily used microcontroller at the present time. It is a very powerful and easy to program integrated circuit. Numerous software and hardware products are available for use with 8051 microcontrollers. A wide range of support tools and third-party products are also available to support 8051 microcontrollers, including emulators, compilers, prototyping/programming adapters, and development systems. In addition, many different variants of 8051 microcontrollers are available to satisfy the requirements posed by various applications.

High-speed 8051 microcontrollers are a family of 8051-compatible microcontrollers providing increased performance compared to the traditional 8051 family of controllers. High-speed 8051 micros are 100% instruction set and object code compatible with the instruction set utilized by the traditional 8051 microcontrollers.

To make faster 8051 microcontrollers, designers have implemented more efficient code, faster clocks, and faster circuits to handle the faster speeds. These faster implementations have resulted in internal memory cycles (i.e., memory cycles which retrieve information from memory within the 8051 microcontroller) being substantially reduced and in many instances requiring only a single machine/clock cycle to execute. In addition, the access times of memory devices external to 8051 microcontrollers have been markedly reduced over the years. Despite the improvement in performance time within the 8051 microcontroller and within external memory, however, external memory cycles (i.e., memory cycles which retrieve information from memory external to 8051 microcontrollers) in the faster 8051 microcontrollers have not improved to the same extent.

For instance, a traditional 8051 microcontroller accesses external memory by using a first parallel input/output (I/O) port to communicate the low byte address multiplexed with data and a second parallel I/O port to communicate the high byte address. An 8051 microcontroller manufactured by Intel® utilizes a first parallel I/O port for communicating the low byte address and a second parallel I/O port for communicating the high byte address multiplexed with data. Because data communicated in an external memory cycle can be in either direction, the I/O port handling the data must be tristated or undriven for a predetermined period of time before data can be placed on the I/O port. Consequently, the bus structures for parallel I/O ports in existing 8051 microcontrollers inherently provide an additional delay not necessarily related to the internal operation of the existing 8051 microcontrollers and external memory.

Based upon the foregoing, there is a need for an 8051 microcontroller that more effectively executes external memory cycles.

SUMMARY OF THE INVENTION

Embodiments of the present invention overcome above-identified shortcomings in prior 8051 microcontrollers and satisfy a significant need for an 8051 compatible controller having enhanced capabilities in accessing external memory. In an exemplary embodiment of the present invention, a microcontroller includes first input/output (I/O) port dedicated as a data port and a second I/O port dedicated as an address port during memory cycles in a page mode of operation. The memory address for a memory cycle is a multiplexed address. By separating data from address in memory cycles when in a page mode, the microcontroller is capable of executing page mode memory cycles faster than prior 8051 microcontrollers.

In another exemplary embodiment of the present invention, the microcontroller selectively configures the first and second I/O ports in one of a plurality of bus structures for performing memory cycles in a page mode of operation. In one configuration, the first I/O port is a dedicated data port and the second I/O port is dedicated as an address port, as described above. In another configuration, the first and second I/O ports may be dedicated to handling data and addresses for memory cycles according to a bus structure of existing microcontrollers. In the first configuration, the cycle time of the memory cycles may be selected from a plurality of different cycle times to accommodate both high speed and lower speed external memory devices.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF AN EXEMPLARY EMBODIMENT

The present invention will now be described more fully hereinafter with reference to the accompanying drawings in which an exemplary embodiment of the invention is shown. This invention may, however, be embodied in many different forms and should not be construed as being limited to the embodiment set forth herein. Rather, the exemplary embodiment is provided so that this disclosure will be thorough and complete, and will fully convey the scope of the invention to those skilled in the art.

Figure 1:
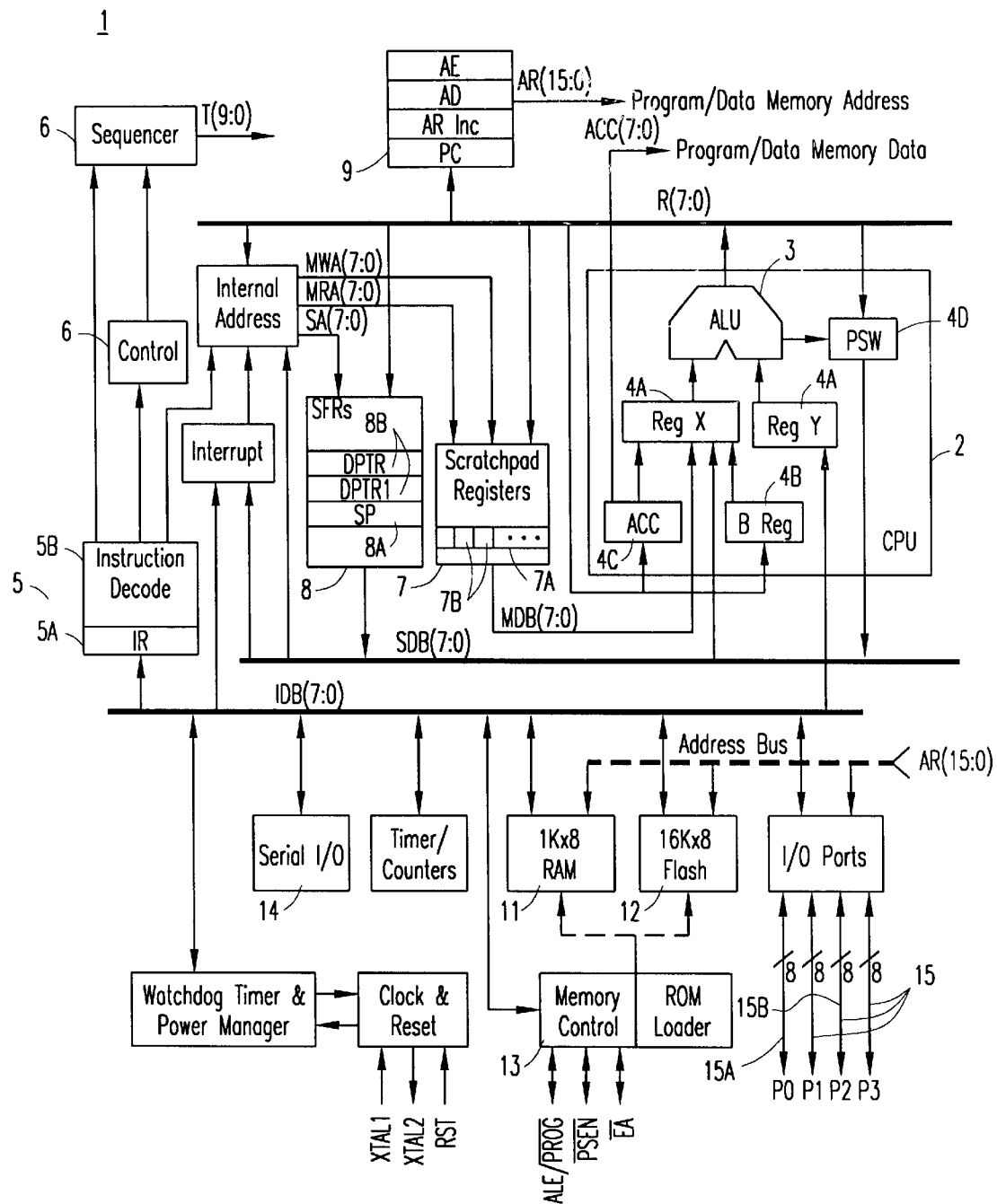
FIG. 1 is a block diagram of an 8051 microcontroller according to an exemplary embodiment of the present invention.

Referring to FIG. 1, there is shown a microcontroller 1 according to an exemplary embodiment of the present invention. Microcontroller 1 is an 8051 compatible microcontroller capable of executing instructions from the 8051 instruction set. In addition, microcontroller 1 cooperates with external memory (not shown) to store information, such as data and program information, in and retrieve information from external memory. When in a page mode of operation, microcontroller 1 employs a dedicated data port and a dedicated address port to execute 8051 memory cycles involving external memory. When in the page mode, microcontroller 1 also configures the cycle time for the memory cycles into any of a plurality of different cycles times.

Microcontroller 1 may include a central processing unit (CPU) 2 which is adapted to perform computations, such as arithmetic and (boolean) logical computations, corresponding to the instructions in the 8051 instruction set. The CPU 2 may include an arithmetic logic unit (ALU) 3 and a plurality of registers 4 for providing information to and storing information generated by ALU 3. The registers include registers 4A having outputs connected to the inputs of ALU 3, register 4B which may provide a second argument byte for use in multiply and divide operations, and an accumulator (ACC) 4C which serves as the source and destination of most operations performed by CPU 2. Most of the instructions in the 8051 instruction set use ACC 4C as an argument. A program status Word (PSW) register 4D contains a plurality of flags that may be asserted during an operation performed by CPU 2. The use of ALU 3 and ACC 4C in an 8051 based microcontroller is known and will not be described further for reasons of simplicity.

Microcontroller 1 may include an instruction decode circuit 5 that generally sequentially receives instructions and/or opcodes thereof from memory and generates control signals for the various components of microcontroller 1 for executing the instructions. Instruction decode circuit 5 may include an instruction register 5A for storing the instruction/opcode and a decode circuit 5B for generating the control signals based upon the instruction/opcode stored in instruction register 5A. A control and sequencing circuit 6 receives control signals generated by instruction decode circuit 5 and provides timing and other signals for carrying out the instruction stored in instruction register 5A.

Microcontroller 1 may further include a plurality of registers for use in executing instructions in the 8051 instruction set. A plurality of general purpose registers may be formed as scratchpad registers 7. For example, scratchpad registers 7 may include four byte wide banks of registers. The registers in scratchpad registers 7 may be addressable and be used as a program stack. Further, microcontroller 1 may include special function registers (SFRs) 8 for, among other things, controlling peripheral circuitry and memory configuration. The SFRs 8 may be accessed using direct addressing. The SFRs 8 may include a stack pointer 8A and a plurality of data pointers 8B for supporting fast data movement in memory. Stack pointer 8A identifies the register location at the top of the stack. It is understood that the stack may be placed in scratchpad registers 7. Data pointers 8B provide a memory address for data move instructions (MOVX).

Microcontroller 1 may further include registers and/or counters. For instance, microcontroller 1 may include a program counter (PC) 9 that identifies the next instruction to be fetched from memory. Connected to PC 9 is an address bus AR which provides address values for opcode and operand fetching and for memory read/write operations.

A random access memory (RAM) 11 is included in microcontroller 1 for storing data to facilitate higher speed operation. A nonvolatile memory 12, such as a flash memory, may be included in microcontroller 1 to maintain certain information that remains unchanged in an absence of power. A memory control circuit 13 provides control signals for accessing internal and external memory.

It is understood that microcontroller 1 may include other circuitry, including a watchdog timer, clock circuitry, timers and other counters.

Microcontroller 1 may utilize an number of internal busses for routing data and address information between the components of microcontroller 1. For instance, microcontroller 1 may include an address bus SA for providing read/write addresses to SFRs 8; a data bus IDB for retrieving instruction fetches from program memory and data read from data memory; a register bus R for providing the output of ALU 3 to scratchpad registers 7 and SFRs 8; and a data bus MDB for providing data from scratchpad registers 7 to ALU 3.

Microcontroller 1 includes a plurality of ports for interfacing with external devices. For example, microcontroller 1 may include at least one serial I/O port 14 for supporting serial communication. Serial port 14 may utilize one or more universal asynchronous receiver/transmitters (UARTs) for serial communication over one or more serial channels. Parallel I/O ports 15 support parallel communication with external devices, such as external memory. Parallel I/O ports 15 may be bi-directional and include addressable latches.

Microcontroller 1, and particularly memory control circuit 13 and parallel I/O ports 15, are capable of being in a page mode of operation for performing a series of memory cycles to/from external memory. In accordance with an exemplary embodiment of the present invention, memory control circuit 13 may configure a first parallel port 15A as a dedicated data port and a second parallel port 15B as a dedicated address port when in the page mode. Microcontroller 1 provides a multiplexed address value (low and high byte address) to address port 15B during a memory cycle to external memory when in the page mode. By having a dedicated bi-directional data port 15A separate from the dedicated address port 15B, more time is available to control the bi-directional data. As a result, memory cycles to external memory in the page mode may be reduced.

During an instruction fetch cycle to external memory when in the page mode, data port 15A is held in a high impedance state by memory control circuit 13. Following external memory driving data port 15A to a value corresponding to the fetched opcode, the fetched opcode is latched into port 15A.

During a page hit (i.e., when the high byte of the address matches the high byte address from the previous memory cycle), dedicated address port 15B is controlled by memory control circuit 13 to only provide the low byte address while the high byte address is held externally. During a page miss (i.e., when the high byte of the address does not match the high byte address from the previous memory cycle), dedicated address port 15B is driven by memory control circuit 13 to the high byte address during the first half of the memory cycle so as to be held or latched externally. The second half of the memory cycle is executed as a page hit memory cycle.

In possessing the capability to perform memory cycles to external memory in less machine and/or system cycles, microcontroller 1 is adapted to accommodate both higher speed external memory devices as well as slower external memory devices when microcontroller 1 is in the page mode. Specifically, microcontroller 1 may configure the cycle time for memory cycles to external memory so that memory cycles are executed in less machine cycles when using a higher speed external memory, and executed in more machine cycles when using a slower external memory. By way of one example, microcontroller 1 may configure the cycle time for memory cycles to external memory in any of three different configuration states when in the page mode. A first configuration state may be one in which memory cycles in the page mode may be a single machine cycle for a page hit and two machine cycles for a page miss. The first configuration state may therefore accommodate high speed external memory devices. A second configuration state may be one in which memory cycles in the page mode may be two machine cycles for a page hit and four machine cycles for a page miss. The second configuration state may accommodate relatively slower external memory devices. A third configuration state may be one in which memory cycles in the page mode may be four machine cycles for a page hit and eight machine cycles for a page miss. The third configuration state may accommodate even slower external memory devices. Microcontroller 1 thus may be configured to perform memory cycles in the page mode to be as fast as the corresponding external memory device.

In order to configure the cycle time of memory cycles in the page mode, a register in microcontroller 1 maintains configuration information. For example, a register 7A in scratchpad registers 7 may include at least two bits 7B that identify the configuration state to be employed by microcontroller 1 during a page mode of operation. Based upon the value maintained by bits 7B of register 7A, memory control circuit 13 controls data port 15A and address port 15B to perform memory cycles in a predetermined number of machine cycles corresponding to the maintained value.

Microcontroller 1 may be further capable of configuring the bus structure of parallel ports 15A and 15B to a bus structure other than dedicating port 15 as a data port and port 15B as an address port. For instance, bits 7B of register 7A may also identify an additional configuration state in which ports 15A and 15B have a bus structure found in existing 8051 microcontrollers. In this way, microcontroller 1 may be configured as a drop-in replacement for existing 8051 microcontrollers.

Figure 2:
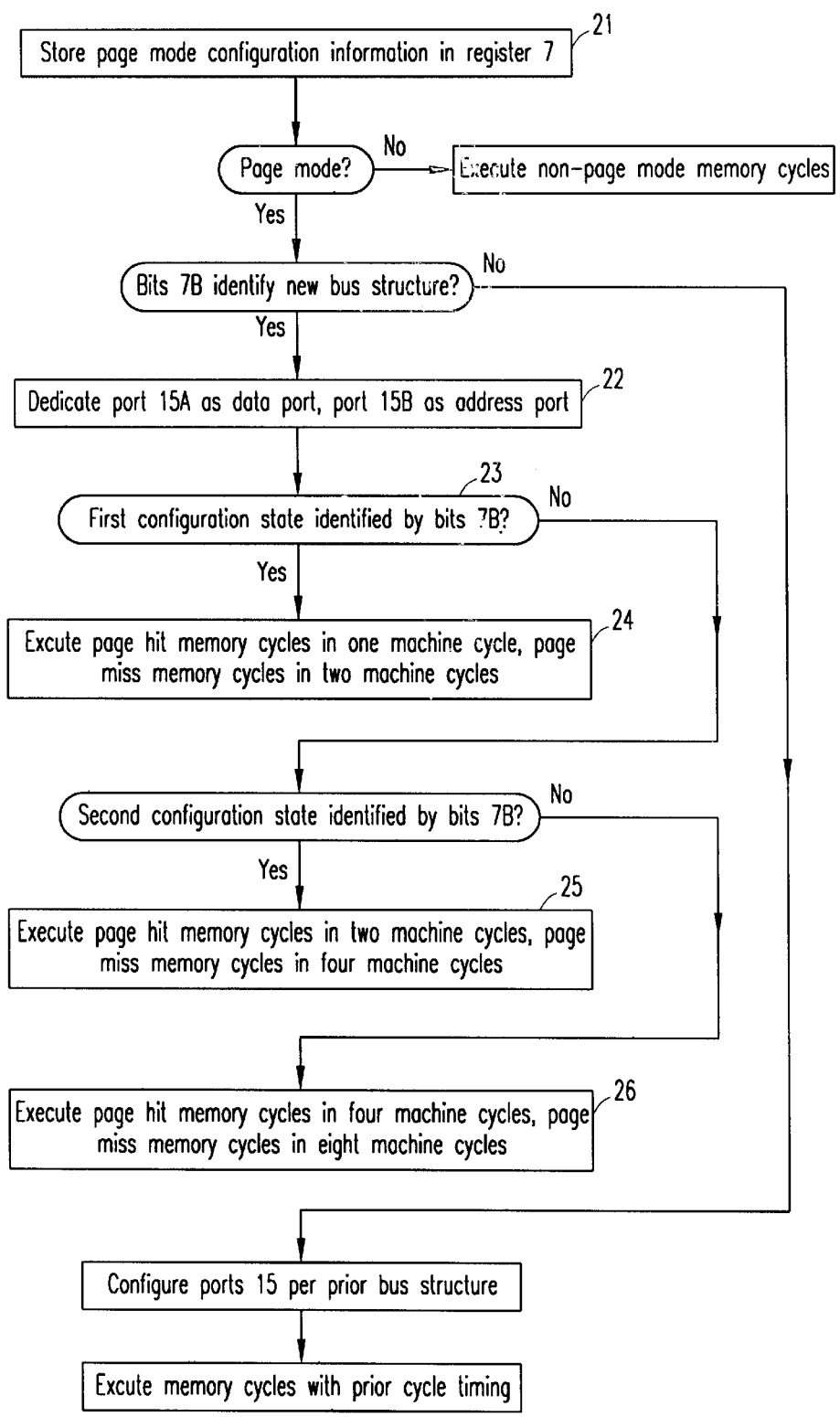
FIG. 2 is a flow chart illustrating the execution of a memory cycle by the microcontroller of FIG. 1.
Figure 3:
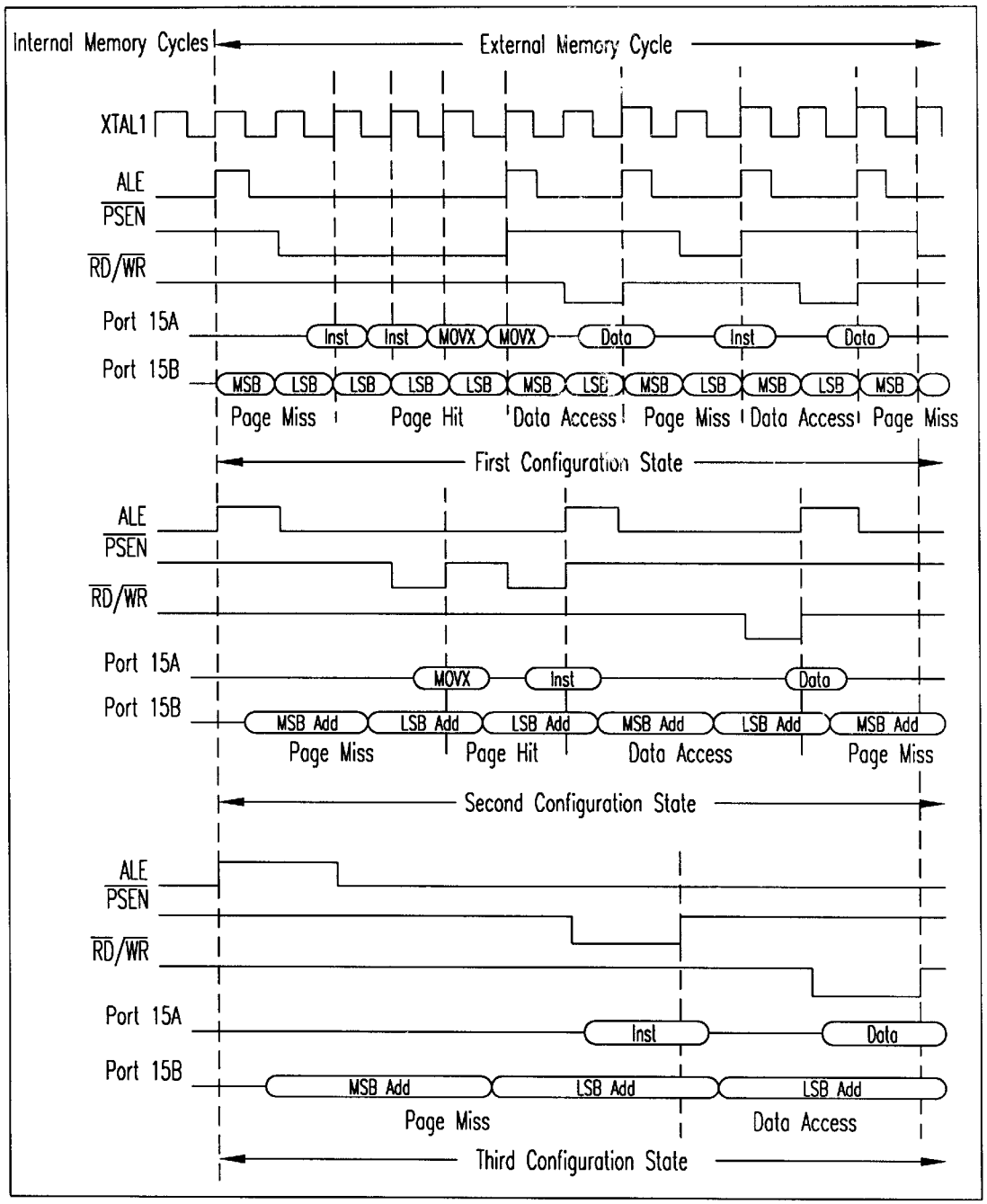
FIG. 3 is a waveform diagram illustrating the execution of memory cycles by the microcontroller of FIG. 1.

The operation of microcontroller 1 will be described with reference to FIG. 2. Initially, register 7A is loaded at 21 with a value so that bits 7B of register 7 identify the desired configuration mode. In the event microcontroller 1 is in the page mode and the value of bits 7B identifies the new bus structure described above, memory control circuit 13 dedicates parallel I/O port 15A as the data port and parallel I/O port 15B as the address port at 22. A determination is made at 23 as to the cycle timing and/or configuration state selected. If the first configuration state is identified by bits 7B, memory control circuit 13 executes memory cycles at 24 such that page hit memory cycles are executed in a single machine cycle and page miss memory cycles are executed in two machine cycles. If the second configuration state is identified by bits 7B, memory control circuit 13 executes memory cycles at 25 such that page hit memory cycles are executed in two machine cycles and page miss memory cycles are executed in four machine cycles. If the third configuration state is identified by bits 7B, memory control circuit 13 executes memory cycles at 26 such that page hit memory cycles are executed in four machine cycles and page miss memory cycles are executed in eight machine cycles. FIG. 3 illustrates memory cycle timing for the three configuration states in the page mode, including control signals ALE, PSEN and RD/WR.

By employing first I/O port 15A as a dedicated data port and second I/O port 15B as a dedicated (multiplexed) address port during the page mode of operation, microcontroller 1 is capable of performing an external memory cycle faster than with prior 8051 bus structures.

Figure 4:
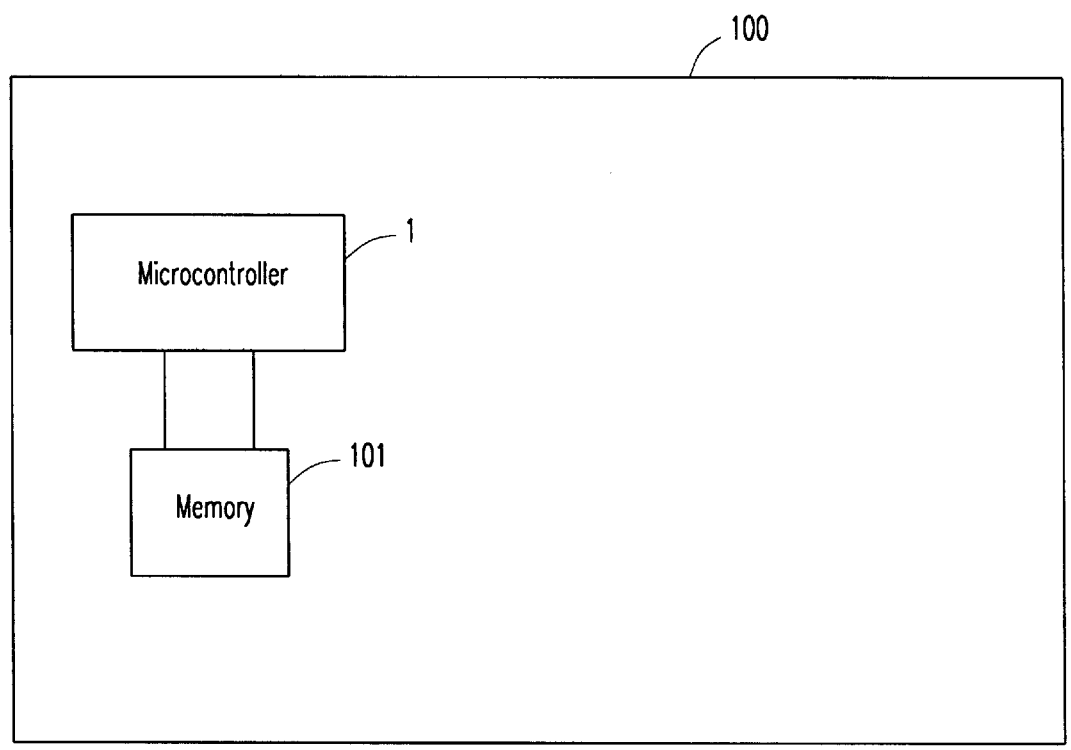
FIG. 4 is a block diagram of a system/apparatus having therein the microcontroller of FIG. 1.

It is understood that microcontroller 1 may be utilized in any of a number of devices, apparatuses and/or systems requiring a microcontroller. For instance, microcontroller 1 may be located in a device/system 100 (FIG. 4) having memory 101 external to microcontroller 1. Microcontroller 1 may be connected to memory 101 via parallel I/O ports 15A and 15B as described above so that memory 101 is employed for storing program and/or data information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microcontroller capable of executing an 8051 instruction set, comprising:
    a memory control circuit;
    first and second input/output (I/O) ports coupled to the memory control circuit and controlled thereby such that the first I/O port is a dedicated data port and the second I/O port is a dedicated address port providing a multiplexed address when the microcontroller is in a page mode of operation; and
    a register, wherein at least one bit of the register is dedicated to identify the cycle time of memory cycles to external memory in the page mode of operation.

2. The microcontroller of claim 1, wherein:
    the first and second I/O ports are eight bit ports.

3. The microcontroller of claim 1, wherein:
    when the microcontroller is configured in the page mode of operation, a memory cycle to external memory is capable of being performed in a single machine cycle.

4. The microcontroller of claim 3, wherein;
    the microcontroller performs the memory cycle in a single machine cycle upon the occurrence of a page hit.

5. The microcontroller of claim 1, wherein:
    a bus structure corresponding to the first and second I/O ports is configurable when the microcontroller is in the page mode of operation.

6. The microcontroller of claim 1, wherein:
    when the microcontroller is in the page mode of operation, a number of machine cycles for performing a memory cycle to external memory using the first and second I/O ports is configurable.

7. The microcontroller of claim 6, wherein:
    in a first configuration, a memory cycle to external memory is capable of being performed in a single machine cycle.

8. The microcontroller of claim 7, wherein:
    in a second configuration, memory cycles to external memory are performed in a plurality of machine cycles.

9. In an 8051 based microcontroller, a method of controlling an external memory device for performing memory operations in a page mode, comprising:
    controlling a first input/output (I/O) port of the microcontroller as a data port for handling data associated with a memory operation;
    controlling a second I/O port of the microcontroller as an address port for handling a multiplexed address associated with the memory operation; and configuring a register, wherein at least one bit of the register is dedicated to identify the cycle time of memory cycles to external memory in the page mode of operation.

10. The method of claim 9, further comprising:

maintaining page mode information; and executing each page hit memory operation in a first predetermined number of machine cycles and each page miss memory operation in a second predetermined number of machine cycles based upon the page mode information.

11. The method of claim 10, wherein:

the first predetermined number is one.

12. The method of claim 9, further comprising:

maintaining page mode information; and selecting a number of machine cycles for executing each page hit memory operation and a number of machine cycles for executing each page miss memory operation based upon the page mode information.

13. The method of claim 9, further including:

maintaining page mode information;

wherein the step of controlling the first I/O port comprises controlling the first I/O port as a data port based upon the page mode information; and the step of controlling the second I/O port comprises controlling the second I/O port as an address port based upon the page mode information.

14. A microcontroller, comprising:

a first input/output (I/O) port;

a second I/O port;

a memory control circuit for controlling the first and second I/O ports and configuring the cycle time of memory cycles to external memory in a page mode of operation using the first and second I/O ports; and a register, wherein at least one bit of the register is dedicated to identify the cycle time of memory cycles to external memory in the page mode of operation.

15. The microcontroller of claim 14, wherein:

the at least one bit of the register comprises two bits thereof.

16. The microcontroller of claim 14, wherein:

based upon a value of the bit of the register, the memory control circuit selectively configures the cycle time of page hit memory cycles to external memory using the first and second I/O ports to be a single machine cycle.

17. The microcontroller of claim 16, wherein:

based upon a value of the bit of the register, the memory control circuit selectively configures the cycle time of page miss memory cycles to external memory using the first and second I/O ports to be two machine cycles.

18. The microcontroller of claim 14, wherein:

the microcontroller is an 8051 compatible microcontroller; and the memory control circuit selectively dedicates the first I/O port as a data bus for memory cycles to external memory and selectively dedicates the second I/O port as an address bus for the memory cycles to external memory when in the page mode of operation.

19. The microcontroller of claim 18, wherein:

the memory control circuit selectively dedicates the second I/O port as an address bus for handling multiplexed addresses.

20. The microcontroller of claim 18, wherein:

at least one bit of the register identifies whether the first I/O port is to be dedicated as a data bus and the second I/O port is to be dedicated as an address bus.

21. An apparatus, comprising:

a memory; and a microcontroller connected to the memory and capable of executing an 8051 instruction set, comprising:

a memory control circuit;

first and second input/output (I/O) ports coupled to the memory control circuit and controlled thereby such that the first I/O port is a dedicated data port and the second I/O port is a dedicated address port providing a multiplexed address when the microcontroller is in a page mode of operation; and a register, wherein at least one bit of the register is dedicated to identify the cycle time of memory cycles to external memory in the page mode of operation.

22. The apparatus of claim 21, wherein:

the first and second I/O ports are eight bit ports.

23. The apparatus of claim 21, wherein:

when the microcontroller is configured in the page mode of operation, a memory cycle to the memory is capable of being performed in a single machine cycle.

24. The apparatus of claim 23, wherein;

the microcontroller performs the memory cycle in a single machine cycle upon the occurrence of a page hit.

25. The apparatus of claim 21, wherein:

a bus structure corresponding to the first and second I/O ports is configurable when the microcontroller is in the page mode.

26. The apparatus of claim 21, wherein:

when the microcontroller is in the page mode of operation, a number of machine cycles for performing a memory cycle to the memory using the first and second I/O ports is configurable.

27. The apparatus of claim 26, wherein:

in a first configuration, a memory cycle to the memory is capable of being performed in a single machine cycle.

28. The apparatus of claim 27, wherein:

in a second configuration, memory cycles to the memory are performed in a plurality of machine cycles.

* * * * *